United States Patent
Stroud

(10) Patent No.: US 10,334,822 B2
(45) Date of Patent: Jul. 2, 2019

(54) BEHAVIORAL TRAINING AID

(71) Applicant: Maria E. Stroud, Madison Heights, MI (US)

(72) Inventor: Maria E. Stroud, Madison Heights, MI (US)

(*) Notice: Subject to any disclaimer, the term of this patent is extended or adjusted under 35 U.S.C. 154(b) by 272 days.

(21) Appl. No.: 15/429,988

(22) Filed: Feb. 10, 2017

(65) Prior Publication Data
US 2017/0238504 A1  Aug. 24, 2017

Related U.S. Application Data

(60) Provisional application No. 62/297,479, filed on Feb. 19, 2016.

(51) Int. Cl.
*A01K 15/02* (2006.01)
*A61D 19/00* (2006.01)
*A61D 19/02* (2006.01)

(52) U.S. Cl.
CPC ............ *A01K 15/02* (2013.01); *A61D 19/00* (2013.01); *A61D 19/021* (2013.01); *A61D 19/022* (2013.01)

(58) Field of Classification Search
CPC ........ A01K 15/00; A01K 15/02; A61D 19/00; A61D 19/021; A61D 19/022; A01M 31/06; A61F 5/00; A61F 5/44; A61H 19/32
See application file for complete search history.

(56) References Cited

U.S. PATENT DOCUMENTS

| | | | | |
|---|---|---|---|---|
| 2,510,249 A | * | 6/1950 | Penksa | A61B 17/43 604/200 |
| 3,309,791 A | * | 3/1967 | Kelley | A61D 19/00 434/225 |
| 3,939,591 A | * | 2/1976 | Schwartztrauber | A01M 31/06 43/3 |
| 4,744,352 A | * | 5/1988 | Emery | A61D 19/021 604/349 |
| 5,195,455 A | * | 3/1993 | van der Lely | A01K 1/01 119/14.03 |

(Continued)

FOREIGN PATENT DOCUMENTS

CN  201216111 Y  4/2009
DE  29618478 U1  11/1997
(Continued)

OTHER PUBLICATIONS

Bee, "Sex Doll for Dogs Satisfies Their Urge to Purge", http://petslady.com/articles/sex_doll_dogs_satisfies_urge_purge_30852, last accessed Nov. 15, 2016.

(Continued)

*Primary Examiner* — Christopher R Harmon
(74) *Attorney, Agent, or Firm* — The Dobrusin Law Firm, PC

(57) ABSTRACT

A behavioral training aid comprising: (a) a body; (b) a tract including: (i) a tract locking mechanism that secures the tract to an outer surface of the body; and (ii) a tract insert removably attached to the tract locking mechanism; (c) one or more legs extending from the body; and (d) one or more base supports extending from a distal end of the one or more legs; wherein the tract insert is configured to receive a receptacle so that the receptacle is elongated and forms a depository within the body.

19 Claims, 13 Drawing Sheets

(56) References Cited

U.S. PATENT DOCUMENTS

| | | | | |
|---|---|---|---|---|
| 5,540,670 | A | * | 7/1996 | Lindholm-Ventola ........................ A61B 10/0058 600/575 |
| 5,695,446 | A | * | 12/1997 | Lindholm-Ventola ........................ A61B 10/0058 600/38 |
| 6,090,088 | A | * | 7/2000 | Nichols ................ A61D 19/021 119/838 |
| 7,086,193 | B1 | * | 8/2006 | Hurst .................. A01M 31/004 43/2 |
| 2002/0032419 | A1 | * | 3/2002 | Barth ................... A61D 19/021 604/349 |
| 2015/0056588 | A1 | * | 2/2015 | Bayer ....................... G09B 5/04 434/236 |
| 2018/0116176 | A1 | * | 5/2018 | Bach ................... A01K 15/003 |

FOREIGN PATENT DOCUMENTS

| | | | | |
|---|---|---|---|---|
| DE | 29801915 U1 | 5/1998 | | |
| FR | 2794358 A1 | * | 12/2000 | ............ A01K 21/00 |
| FR | 2794358 A1 | 12/2000 | | |
| KR | 20080024171 A | 3/2008 | | |
| WO | 2010/139036 A1 | 12/2010 | | |

OTHER PUBLICATIONS

"Hot Doll", http://www.hotdollfordogs.com/produit.php?ref=hd1&id_rubrique=1&lang=2, last accessed Jan. 4, 2017.

* cited by examiner

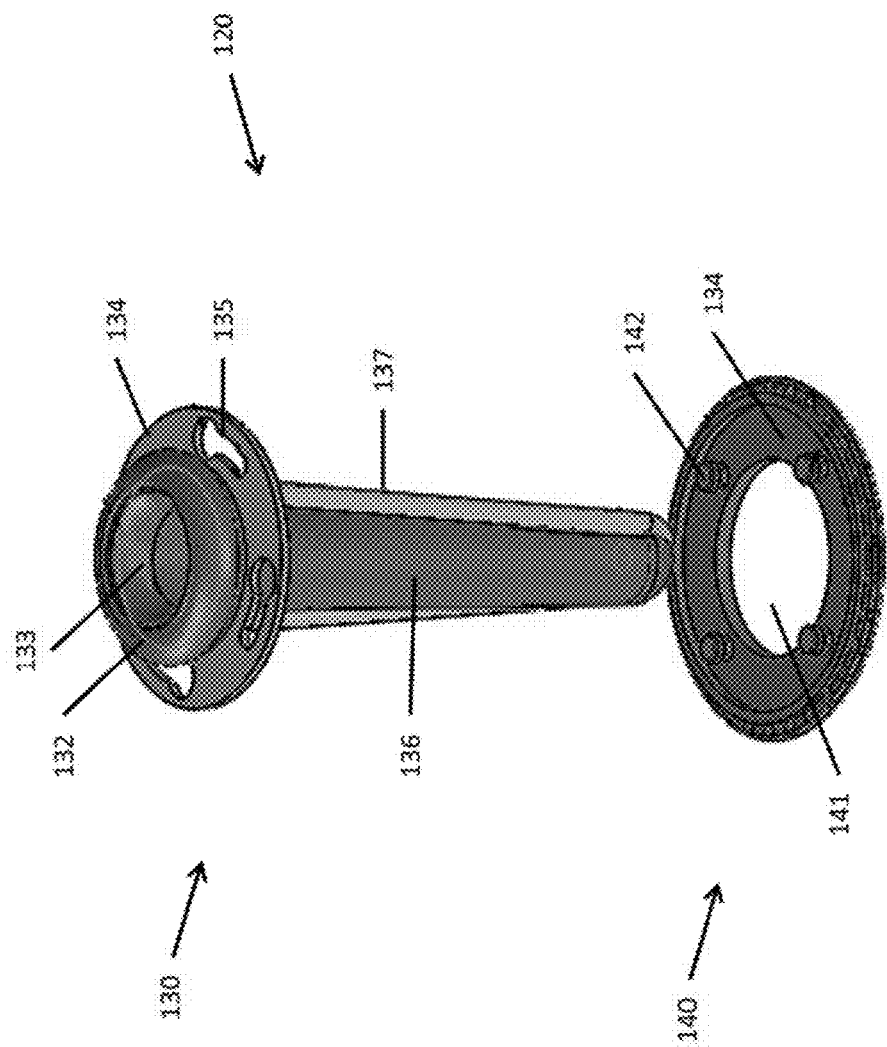

BEHAVIORAL TRAINING AID

FIELD

The present teachings generally relate to a behavioral training aid that is adapted to receive and support a removable tract, providing a convenient and sanitary method of behaviorally training animals.

BACKGROUND

Male and female animals may display behavioral issues such as aggression, violence, depression, frustration, and anxiety. These behavioral issues often stem from sexual tension from animals that may or may not be neutered. Attempts have been made to create devices that allow for these animals to relieve their tension and minimize the behavioral issues. Some of examples of such devices may be found in International Pub. No. WO2010/139036A1; U.S. Pat. No. 4,744,352; and "Hot Doll" device website: http://www.hotdollfordog.com/produit.php?ref=hd1&id rubrique=1&lang=2, last accessed Jan. 4, 2017.

Therefore, it would be attractive to have a behavioral training aid with a removable insert that includes a disposable liner to ensure sanitary use. It would also be attractive to have the behavioral training aid stable enough for use by animals without unwanted movement or damage during training. Additionally, it would be attractive to have the behavioral training aid be adjustable in height and pitch to accommodate different size animals. Furthermore, it would be attractive to have the behavioral training aid include a mechanism to expand and remove a liner from the device without physical contact by the installer.

SUMMARY

The present teachings meet one or more (if not all) of the present needs by providing a behavioral training aid comprising: (a) a body; (b) a tract including: (i) a tract locking mechanism that secures the tract to an outer surface of the body; and (ii) a tract insert removably attached to the tract locking mechanism; (c) one or more legs extending from the body; and (d) one or more base supports extending from a distal end of the one or more legs; wherein the tract insert is configured to receive a receptacle so that the receptacle is elongated and forms a depository within the body.

The present teachings provide a behavioral training aid comprising: (a) a body; (b) a tract including: (i) a tract locking mechanism that secures the tract to an outer surface of the body; and (ii) a tract insert comprising an artificial vulva that forms an orifice removably attached to the tract locking mechanism; (c) one or more legs extending from the body, wherein the one or more legs adjusts a height and a pitch of the body; (d) one or more base supports extending from a distal end of the one or more legs; and (e) a voice box located within the body; wherein the tract insert is configured to receive a receptacle so that the receptacle is elongated and forms a depository within the body; and wherein the receptacle is fastened to the artificial vulva and elongated through the orifice to form the depository within the body.

Additionally, the present teachings provide a behavioral training aid comprising: (a) a body; (b) a tract including: (i) a tract locking mechanism that secures the tract to an outer surface of the body; and (ii) a tract insert comprising an artificial vulva that forms an orifice removably attached to the tract locking mechanism; (c) one or more legs extending from the body, wherein the one or more legs adjusts a height and a pitch of the body; (d) one or more feet extending from a distal end of the one or more legs; and (e) a voice box located within the body; wherein the tract insert is configured to receive a receptacle so that the receptacle is elongated and forms a depository within the body; wherein the receptacle is fastened to the artificial vulva and elongated through the orifice to form the depository within the body; wherein the receptacle is disposable and replaceable after each training session; wherein the one or more feet are mounted to a top surface of a platform for additional stability using fasteners, non-slip gripping material, adhesives, or a combination thereof; wherein a push rod comprises a head mounted to a distal end of a shaft; and wherein the head of the shaft is inserted into the receptacle secured to the artificial vulva and pushed to elongate the receptacle until the end of the receptacle is secured by the receptacle securing mechanism.

The present teachings provide a behavioral training aid that has a removable insert that includes a disposable liner to ensure sanitary use. The present teachings provide a behavioral training aid stable enough for use by animals without unwanted movement or damage during training. The present teachings provide a behavioral training aid adjustable in height and pitch to accommodate different size animals. The present teachings provide a behavioral training aid that includes a mechanism to expand and remove a liner from the device without physical contact by the installer.

BRIEF DESCRIPTION OF THE DRAWINGS

FIG. 2 illustrates a close-up view of a tract;

DETAILED DESCRIPTION

Figure 1A:
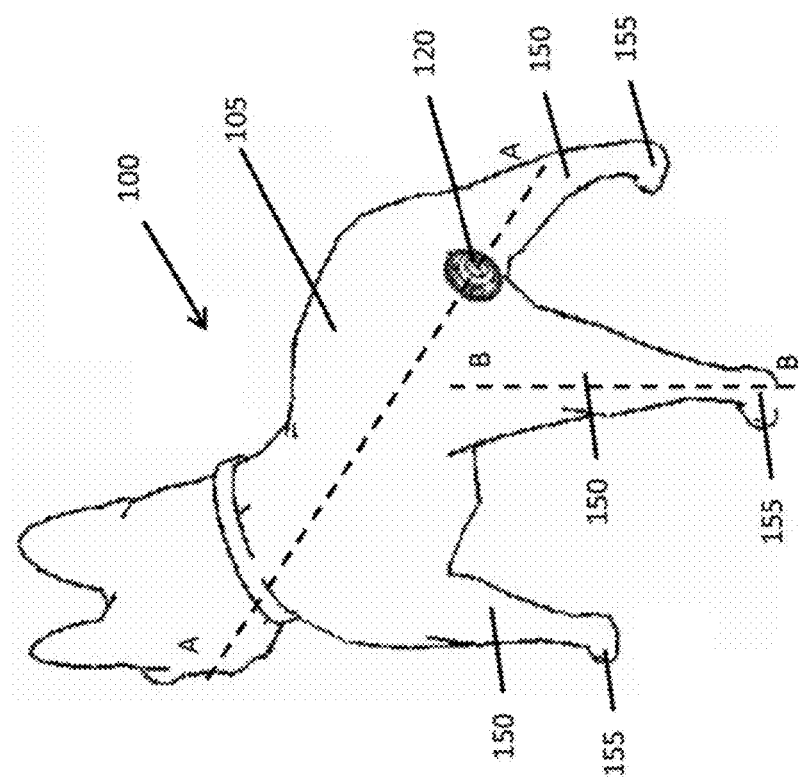
FIG. 1A illustrates a perspective view of a behavioral training aid.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide an improved behavioral training aid. The behavioral training aid functions to provide a training mechanism for animals so that an animal can interact with the behavioral training aid to alter or modify their behavior. The behavioral training aid functions to provide a training tool that the animal is attracted to and desires to engage with. The behavioral training aid may retain any bodily fluids from an animal after training to allow for sanitary and easy disposal of the fluids. The behavioral training aid may allow for easy cleaning of all internal parts. Individual components may be removed, detached, added, connected, or a combination thereof to the behavioral training aid. The behavioral training aid may be structurally rigid to support the weight of the animal during training. The behavioral training aid may be comprised of a variety of materials. All or a portion of the behavioral training aid may be made from or include: metals, such as aluminum or steel; plastic; a polymer; an overmolded material; a composite; a natural material; a synthetic material; an alloy; or a combination thereof. The behavioral training aid may include a synthetic fur. All or a portion of the behavioral training aid may be injection-molded, stamped, or cast. The behavioral training aid may include a frame. The frame may vary in rigidity and weight support. For example, the frame may support about 25 pounds or less, about 50 pounds or less, about 75 pounds or less, about 100 pounds or less, about 125 pounds or more, about 150 pounds or more, or preferably about 150 pounds or less. The behavioral training aid may include one or more layers covering the frame. The one or more layers may be connected to the frame using adhesives, clips, fasteners, or a combination thereof. The one or more layers may be integrally formed onto the frame. For example, the one or more layers covering the frame may be made of a high-density foam that may be cured to surround the frame. The behavioral training aid may be free of a frame. The behavioral training aid may have different components that are each made of different material. For example, the legs may be made of metal and the body may be made of a plastic. The behavioral training aid may vary in dimensional size and shape. The behavioral training aid may be round, oval, rectangular, trapezoidal, symmetrical, asymmetrical, oblong, or a combination thereof. The behavioral training aid may resemble the shape of any animal. Preferably, the behavioral training aid may resemble a dog. The behavioral training aid may include a platform. The behavioral training aid may include legs and base supports. The behavioral training aid may include a body. The behavioral training aid may include a push rod.

The body may function to support the animal during training. The body may function to receive and secure one or more components of the behavioral training aid. The body may be weighted to ensure the behavioral training aid does not move during training. While the body may be weighted, a handler may still be able to move the behavioral training aid from one location to a second location. The body may include a frame. The frame may vary in rigidity and weight support. For example, the frame may support about 25 pounds or less, about 50 pounds or less, about 75 pounds or less, about 100 pounds or less, about 125 pounds or more, about 150 pounds or more, or preferably about 150 pounds or less. The body may include one or more layers covering the frame. The one or more layers may be connected to the frame using adhesives, clips, fasteners, or a combination thereof. The one or more layers may be integrally formed onto the frame. For example, the one or more layers covering the frame may be made of a high-density foam that may be cured to surround the frame. The body may include different materials at different locations of the body. For example, the body may include a more durable material, such as leather, at areas of frequent contact. The body may be free of a frame. The body may be stuffed with various materials, such as foam, feathers, cotton, linen, wool, pellets, or a combination thereof. The body may be solid or hollow. The body may resemble the shape of an animal, such as a cat or horse. Preferably, the body may resemble a dog. The body may include a face that further resembles an animal, such as a dog. The body may be round, oval, rectangular, trapezoidal, symmetrical, asymmetrical, oblong, or a combination thereof. All or a portion of the body may be made from or include: metals, such as aluminum or steel; plastic; a polymer; an overmolded material; a composite; a natural material; a synthetic material; an alloy; or a combination thereof. All or a portion of the body may be made of a thermosetting polymer, such as vulvanized rubber, polyurethanes, phenol-formaldehyde, epoxy resins, polyimides, silicone, or a combination thereof. Preferably, the thermosetting polymer is substantially rigid when cured. The body may include animal fur or synthetic fur. The body may be injection-molded, stamped, or cast. A tract may be removably attached to the body. A voice box may be located within the body. The body may have one or more legs protruding from an outer surface.

The voice box may function mimic the sound of a desired animal to attract an animal during training. The voice box may function to make a noise that attracts an animal to interact with the behavioral training aid. The voice box may be battery operated. The voice box may include a recording device to record different sounds. The voice box may include a rechargeable battery. The voice box may be located in the interior of the body. The voice box may be attached to a surface of the body. The voice box may be removably attached to the body for easy replacement and installation. The voice box may include a mechanical crank to generate power. The voice box may be remote operated. An operator may adjust the volume of the voice box. The voice box may include a desired memory for storage of a plurality of desired sounds. The voice box may be motion activated.

The one or more legs may function to stabilize the behavioral training aid during training, and may ensure the behavioral training aid does not fall over, tip, or slide. The one or more legs may function to adjust the height and the pitch of the body relative to a horizontal plane. The one or more legs may be adjustable in height. The one or more legs may be attached to the body using one or more fasteners, adhesives, heat-staking, or a combination thereof. The one or more legs may include a ball at a proximal end that engages with a socket of the body, allowing for free movement of the one or more legs relative to the body. The one or more legs may be integrally formed with the body as one piece or integrally formed with the frame of the body. The one or more legs may be hollow and adapted to receive an inserted base support. For example, the hollow cavity of the leg and base support may be threaded respectively to allow the secondary piece to be screwed into the hollow portion, thus adjusting the height of the leg. The leg and base support may be engaged using a locking mechanism. For example, a pin of the leg may engage a cutout of the base support when set at a desired height. The leg and base support may adjust the height using a hydraulic mechanism. The legs may be weighted to further ensure the behavioral training aid does not move during training. The body may be round, oval, rectangular, trapezoidal, symmetrical, asymmetrical, oblong, or a combination thereof. The one or more legs may be created from metals, such as aluminum or steel, plastic, a polymer, an overmolded material, a composite, a natural material, a synthetic material, an alloy, or a combination thereof. The one or more legs may include animal fur or synthetic fur. The one or more legs may be injection-molded, stamped, or cast. The one or more legs may have one or more base supports attached to a proximal end.

The one or more base supports may function to support the weight of an animal during training. The one or more base supports may function to secure the behavioral training aid to a surface. The one or more base supports may be fixedly attached to the one or more legs. The one or more base supports may be engaged to the one or more legs to adjust the height and pitch of the behavioral training aid. The one or more base supports may be engaged to the one or more legs using a threading, a locking mechanism, a hydraulic mechanism, an electric motorized mechanism, or a combination thereof. The one or more base supports may be press fit to the one or more legs (i.e., a receiving portion of the leg may be slightly smaller than a portion of the base support to allow for interference between the base support and the leg once pressure is applied). The one or more base supports may be removably attached to the one or more legs. The one or more base supports may include one or more holes, recesses, cut-outs, or a combination thereof, to attach to the surface or receive one or more projections from the surface. For example, the one or more base supports may include a clamping mechanism that engages with a peg projecting from a surface, and releases the engagement when a user presses a release button. The one or more base supports may be one or more feet. For example, the one or more feet may secure the behavioral training aid to a surface using adhesives, fasteners, touch fasteners, hook-and-loop fasteners, or a combination thereof. The fasteners may be a screw, bolt, nail, staple, clip, rivet, weld, solder, braze, heat staking, or a combination thereof. The adhesive may be glue, epoxy, polymer adhesives, rubber adhesives, or a combination thereof. The one or more base supports may be removably attached to a surface or platform, such as carpet, wood, cement, cardboard, plastic, or a combination thereof. The one or more base supports may be attached to a plurality of platforms. For example, one of the one or more base supports may be attached to a first platform while a remainder of the one or more base supports may be attached to a second platform.

The tract may function to form a cavity within the body and provide a receptacle for bodily fluids expelled from an animal during training. The tract may function to provide artificial female genitalia of a desired animal, such as a dog. The tract may allow for easy cleaning after training. The tract may be removable. The tract may be disposable. Individual components may be removed, detached, added, connected, or a combination thereof to the tract insert. The tract may be comprised of a variety of materials. The tract may be created from metals, such as aluminum or steel, plastic, a polymer, an overmolded material, a composite, a natural material, a synthetic material, an alloy, or a combination thereof. Preferably, the tract may be made from an elastomeric material, such as rubber or silicone. More preferably, the elastomer includes a lubrication to minimize tackiness of the tract and friction between the tract and animal during training. The tract may vary in dimensional size and shape. The tract may be round, oval, rectangular, trapezoidal, symmetrical, asymmetrical, oblong, or a combination thereof. The tract may include a tract insert. The tract may include a tract locking mechanism attached to a surface of the body.

The tract locking mechanism may function to secure the tract to the body of the behavioral training aid. The tract locking mechanism may include a flange extending radially from a center point of the tract locking mechanism. A surface of the flange may abut a surface of the body to secure the locking mechanism to the body. The flange may be press-fit onto the body. The flange may be attached to the body using fasteners, adhesives, touch fasteners, hook-and-loop fasteners, or a combination thereof. The flange may be sewn to the body. A surface of the flange may include one or more contact surfaces.

The one or more contact surfaces may function to engage with the body and minimize unwanted rotation of the tract locking mechanism once attached to the body. The one or more contact surfaces may vary in dimensional size and shape. The one or more contact surfaces may extend radially around a cutout of the tract locking mechanism.

The cutout may function to allow for the tract, once secured to the body, to recess into the body of the behavioral training aid. The cutout may vary in dimensional size and shape. The cutout may be surrounded by one or more locking features along a perimeter.

The one or more locking features may function to secure a tract insert to the tract locking mechanism. The one or more locking features may function to removably attach a tract insert to the tract locking mechanism. The one or more locking features may protrude from a surface of the flange opposite of the surface that engages the body of the behavioral training aid. The one or more locking features may protrude substantially perpendicular to the surface of the flange, or at an angle. The one or more locking features may be substantially integrated into the tract locking mechanism. The one or more locking features may be fixedly attached to the tract locking mechanism using fasteners, adhesives, or a combination thereof. The one or more locking features may be made from a similar material as the flange, or from a different material. For example, the flange may be made of a metal while the one or more locking features may be made of a molded plastic. The one or more locking features may be a button to engage a keyhole slot. The one or more locking features may create one or more recesses to secure one or more engaging features. For example, one or more projected engaging features may be twisted into position resting under the one or more locking features. The one or more locking features may vary in dimensional size and shape. The one or more locking features may be round, oval, rectangular, trapezoidal, symmetrical, asymmetrical, oblong, or a combination thereof. The one or more locking features may secure one or more engaging features of the tract insert.

The one or more engaging features may function to attach the tract insert to the tract locking mechanism and body of the behavioral training aid. The one or more engaging features may compliment the shape of the one or more locking features, such as a male/female mechanism. For example, the locking feature may be a male protruding button, and the engaging feature may be a female keyhole slot. The one or more engaging features may extend radially from a center point of the tract insert. The one or more engaging features may include one or more holes, recesses, cut-outs, or a combination thereof, to engage the one or more locking features. The one or more engaging features may be located on a surface of a flange of the tract insert. The one or more engaging features may secure a bottom surface of the tract insert flange to a top surface of the tract locking mechanism flange to align the cutout of the tract locking mechanism with the orifice of the tract insert.

The orifice may function to allow access through the cutout of the tract locking mechanism into an inner cavity of the body. The orifice may be a hollow projection starting on a top surface of the tract insert and extending through a bottom surface of the tract insert. The orifice may be integrally formed with the tract insert, or may be created after forming the tract insert (e.g., punching out excess material to from the orifice). An outer perimeter of the orifice may be formed by an artificial vulva.

The artificial vulva may function to form the orifice and mimic female genitalia of a desired animal. The artificial vulva may include an outer lip. The artificial vulva may extend inwardly to contact an inner circumference of the cutout of the tract locking mechanism. The artificial vulva may vary in dimensional size and shape. The artificial vulva may be round, oval, rectangular, trapezoidal, symmetrical, asymmetrical, oblong, or a combination thereof. The artificial vulva may be created from metals, such as aluminum or steel, plastic, a polymer, an overmolded material, a composite, a natural material, a synthetic material, an alloy, or a combination thereof. Preferably, the artificial vulva may be made from an elastic polymer to allow for expansion and contraction during training. For example, the artificial vulva may be made from an elastomeric material such as silicone or rubber. The artificial vulva may be free of latex. The artificial vulva may be lubricated to decrease friction during training sessions. The artificial vulva may include an excretion to attract the animal for training. The excretion may be integrally formed with the artificial vulva or added to a surface of the artificial vulva. For example, the artificial vulva may include a cavity that holds a fluid and regulates the excretion. The regulation may occur by a motion sensor, a contact sensor, a manual button, or a combination thereof. A receptacle may be secured to the outer lip of the artificial vulva.

The receptacle may function to create a reservoir to capture any bodily fluids expelled by the animal during training. The receptacle may function to provide easy cleaning of the tract insert after training. The receptacle may be disposable and may be replaced after each training session. The receptacle may be a rigid structure substantially tubular in shape to recess into the body of the behavioral training aid. Preferably, the receptacle may be flexible and allow for manipulation when attaching to the artificial vulva. The receptacle may be attached to the artificial vulva using an adhesive, fastener, clip, or a combination thereof. The receptacle may be attached using a method free of adhesives, fasteners, or clips. The receptacle may be attached by expanding the receptacle opening around the outer lip of the artificial vulva to secure the receptacle from unwanted movement during training. The receptacle may require elongation after installation to line the entire tract insert. The receptacle may vary in dimensional size and shape. The receptacle may be round, oval, rectangular, trapezoidal, symmetrical, asymmetrical, oblong, or a combination thereof. The receptacle may be created from plastic, a polymer, an overmolded material, a composite, a natural material, a synthetic material, or a combination thereof. Preferably, the receptacle may be made from elastic latex to allow for elongation and flexibility during training. The receptacle, once elongated, may be supported by a receptacle support.

The receptacle support may function to minimize unwanted movement of the receptacle during training. The receptacle support may function to aid in proper installation of the receptacle by guiding elongation of the receptacle. The receptacle support may be integrally connected to the artificial vulva. The receptacle support may be integrally connected to the flange of the tract insert. The receptacle support may project substantially perpendicular to a bottom surface of the flange for insertion into a cavity of the body of behavioral training aid. The receptacle support may extend approximately the same distance as the depth of the cavity in the body. The receptacle support may vary in dimensional size and shape. The receptacle support may be created from metals, such as aluminum or steel, plastic, a polymer, an overmolded material, a composite, a natural material, a synthetic material, an alloy, or a combination thereof. A distal end of the receptacle support may attach to a receptacle securing mechanism.

The receptacle securing mechanism may function to maintain the shape of the receptacle after elongation. The receptacle securing mechanism may function to substantially stop unwanted movement of the receptacle during training. The receptacle securing mechanism may be integrally formed at a distal end of the receptacle support. The receptacle securing mechanism may be attached to the receptacle support using fasteners, adhesives, or a combination thereof. The receptacle securing mechanism may be positioned along the receptacle securing mechanism at a defined location not located at the distal end. The receptacle securing mechanism may include an attachment to secure the receptacle in position. The attachment may be a fastener, clip, adhesive, clamp, magnet, or a combination thereof. The receptacle securing mechanism may be made of a similar material to that of the receptacle support, or a different material. An operator of the behavioral training aid may elongate the receptacle and connect the receptacle to the receptacle securing mechanism using a push rod.

The push rod may function to elongate a receptacle into the tract insert before or after installation of the tract insert into the body. The push rod may function to connect the receptacle to the receptacle securing mechanism. The push rod may include a shaft, a head, or a combination thereof. The push rod may be shaped similar to the interior of the tract insert. The push rod may be created from metals, such as aluminum or steel, plastic, a polymer, an overmolded material, a composite, a natural material, a synthetic material, an alloy, or a combination thereof. An operator may guide the push rod into a desire position using a shaft.

The shaft may function as a handle for an operator. The shaft may function to reach a desired position within the tract insert. The shaft may vary in length and size. Preferably, the shaft may be a length equivalent to the desired length of an elongated receptacle. Even more preferably, the shaft may be a length greater than the desired length of an elongated receptacle. The shaft may be hollow or solid. The shaft may be substantially cylindrical. The shaft may match the desired interior shape of the tract insert. The exterior of the shaft may be smooth to minimize accidental ripping of the receptacle. The shaft may include a mating pin a one end to mate to a head.

The head may function to extend a distal end of the receptacle to the receptacle securing mechanism. The head may include a shape that mates to the receptacle securing mechanism. For example, the head may include a substantially triangular shaped protrusion that mates to a substantially triangular shaped recess in the receptacle securing mechanism. The head may be made of a similar material to that of the shaft, or a different material. The head may vary dimensionally in shape and size. The head may include a recess that connects to the mating pin of the shaft. For example, the recess of the head may connect to the shaft using a press-fit condition by inserting the mating pin into the recess of the head.

FIG. 1A illustrates a perspective view of a behavioral training aid 100. The behavioral training aid 100 includes a body 105. A tract 120 is mounted to a surface of the body 105 at a rear of the behavioral training aid 100. One or more legs 150 extend from the body 105. One or more base supports 155 are connected to a distal end of the one or more legs 150.

Figure 1B:
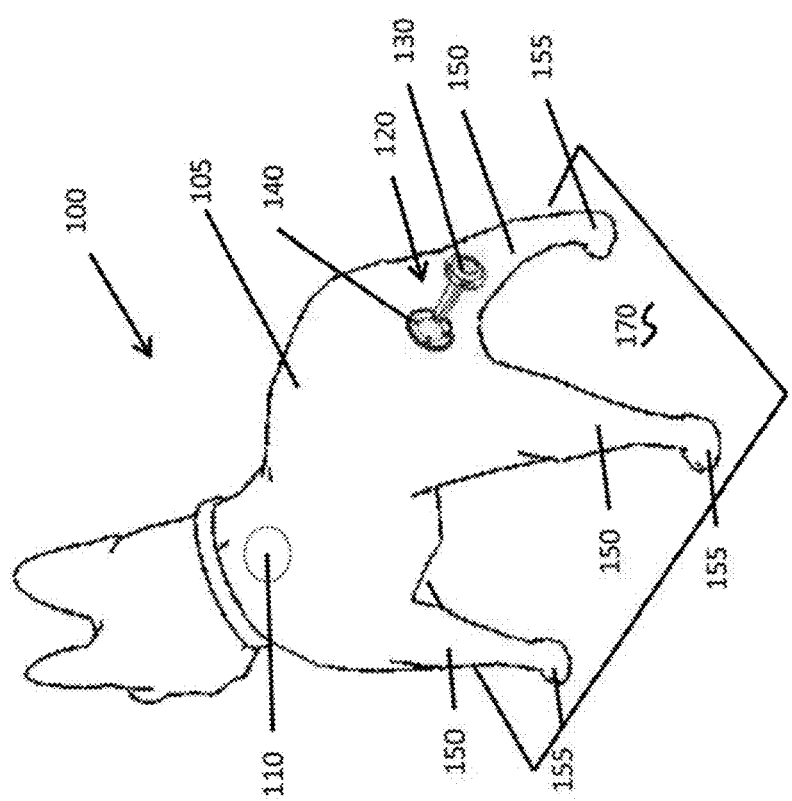
FIG. 1B illustrates a perspective view of a behavioral training aid.

FIG. 1B illustrates a different perspective view of a behavioral training aid 100. The behavioral training aid 100 includes a body 105. A voice box 110 is located within the body 105. A tract locking mechanism 140 of a tract 120 is mounted to a surface of the body 105 at a rear of the behavioral training aid 100. A tract insert 130 of the tract 120 is removably attached to the tract locking mechanism 140. One or more legs 150 extend from the body 105. One or more base supports 155 are connected to a distal end of the one or more legs 150. The one or more base supports 155 are mounted to a platform 170.

Figure 1C:
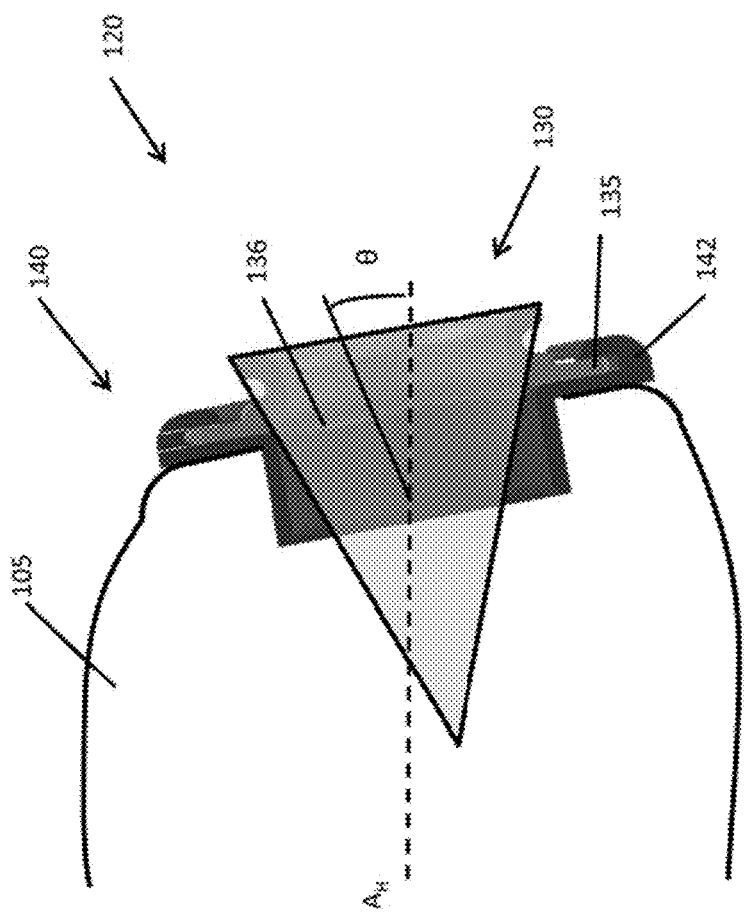
FIG. 1C illustrates a cross-section view of a tract.

FIG. 1C illustrates a cross-section view of a behavioral training aid 100 along cross-section line A-A shown in FIG. 1A. A tract locking mechanism 140 of a tract 120 is mounted to a surface of the body 105. A tract insert 130 is inserted into the tract locking mechanism 140. One or more engaging features 135 of the tract insert 130 are removably engaged with one or more locking features 142 of the tract locking mechanism 140. A receptacle 136 is secured to the tract insert 130 and extends into the body 105 of the behavioral training aid 100. The tract 120 is positioned at an angled θ relative to a horizontal plane $A_H$.

Figure 1D:
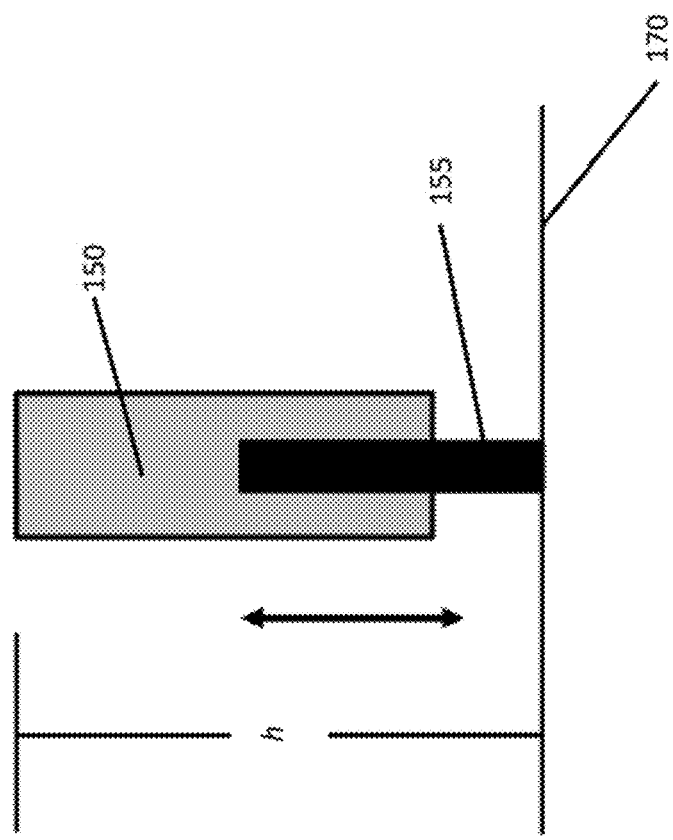
FIG. 1D illustrates a cross-section view of a leg of a behavioral training aid.

FIG. 1D illustrates a cross-section of a leg along cross-section line B-B shown in FIG. 1A. A base support 155 is inserted into a bottom cavity of a leg 150. The depth of the base support 155 within the cavity of the leg 150 is adjustable to alter a height h of a behavioral training aid 100. The shallower the depth of the base support 155 within the cavity of the leg 150, the greater the height h. The deeper the depth of the base support 155 within the cavity of the leg 150, the smaller the height h. The base support 155 is secured to a platform 170.

FIG. 2 illustrates a close-up view of a tract 120. A tract insert 130 includes an artificial vulva 132 mounted to a top surface of a flange 134. The flange 134 includes one or more engaging features 135. The artificial vulva 132 forms an orifice 133. A receptacle 136 is secured to the artificial vulva 132 and elongated through the orifice 133 in a substantially perpendicular direction to a bottom surface of the flange 134. A receptacle support 137 also extends in a substantially perpendicular direction to the bottom surface of the flange 134 to support the elongated receptacle 136. A tract locking mechanism 140 is also illustrated. The tract locking mechanism 140 includes one or more locking features 142 located on a top surface of a flange 134. The tract insert 130 can be inserted into a cutout 141 of the tract locking mechanism 140. Once inserted, the one or more engaging features 135 of the tract insert 130 can be removably secured to the one or more locking features 142 of the tract locking mechanism 140.

Figure 3:
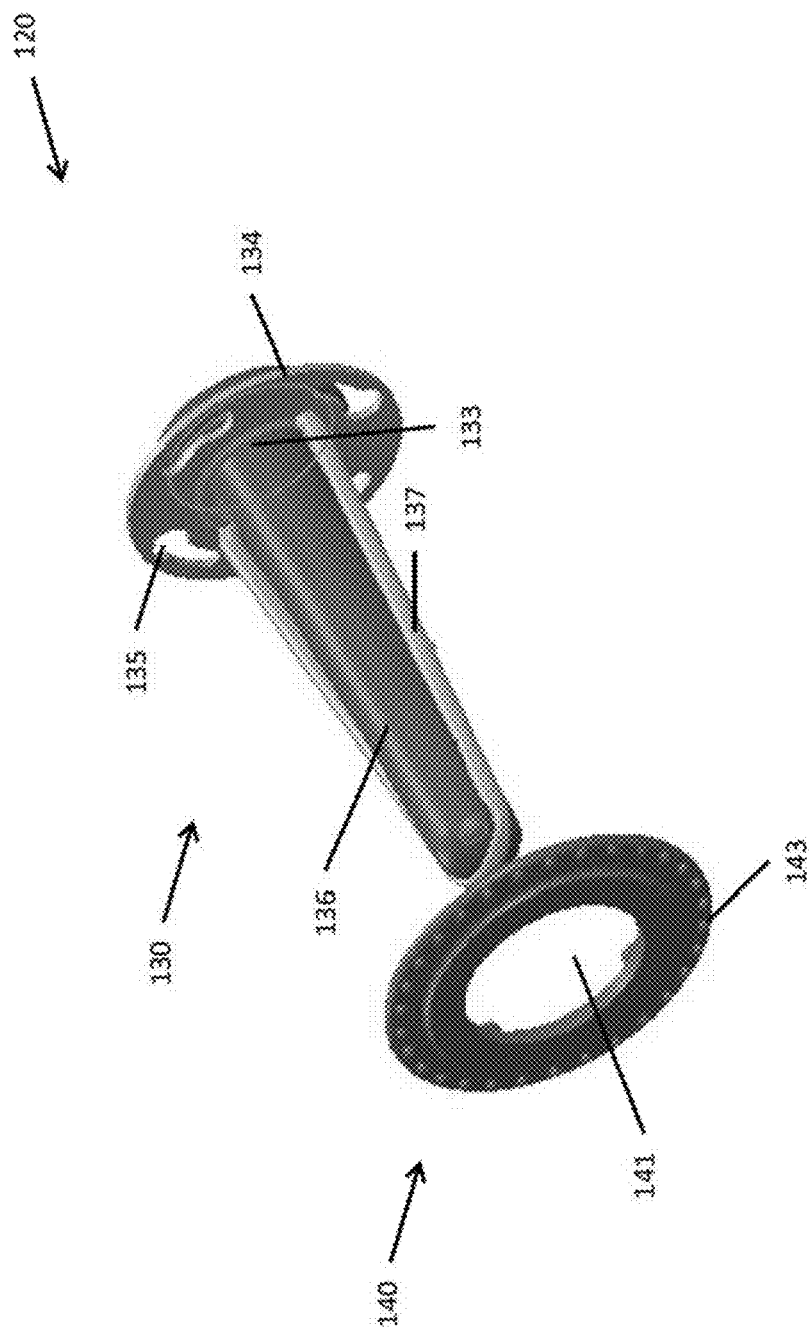
FIG. 3 illustrates a close-up view of a tract.

FIG. 3 illustrates a different close-up view of a tract 120. A tract insert 130 includes a flange 134 with one or more engaging features 135. A receptacle 136 is secured in a similar manner as shown in FIG. 2, and elongated through an orifice 133 in a substantially perpendicular direction to a bottom surface of the flange 134. A receptacle support 137 also extends in a substantially perpendicular direction to the bottom surface of the flange 134 to support the elongated receptacle 136. A tract locking mechanism 140 is also illustrated. A plurality of contact surfaces 143 are located on a bottom surface of the tract locking mechanism 140 that contact a body 105 (not shown) of a behavioral training aid 100 (not shown). The tract insert 130 can be inserted into a cutout 141 of the tract locking mechanism 140. Once inserted, the one or more engaging features 135 of the tract insert 130 can be removably secured to one or more locking features 142 (not shown) of the tract locking mechanism 140.

Figure 4:
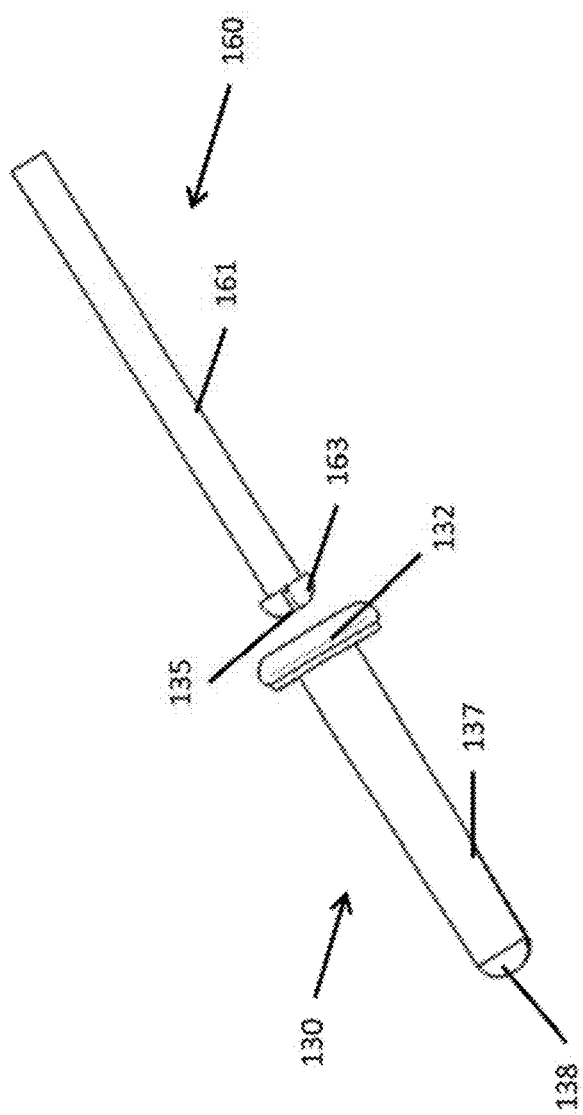
FIG. 4 illustrates a close-up view of a tract insert and a push rod.

FIG. 4 illustrates a close-up view of a tract insert 130 and a push rod 160. The tract insert 130 includes an artificial vulva 132. A receptacle support 137 projects substantially perpendicular from a bottom surface of the artificial vulva 132. A receptacle securing mechanism 138 is located at a distal end of the receptacle support 137 to secure an elongated receptacle 136 (not shown). The push rod 160 can be inserted into the tract insert 130 to elongate and secure the receptacle 136 (not shown) to the receptacle securing mechanism 138. The push rod 160 includes a shaft 161. A head 163 including an engaging feature 135 is attached to an end of the shaft 161.

Figure 5:
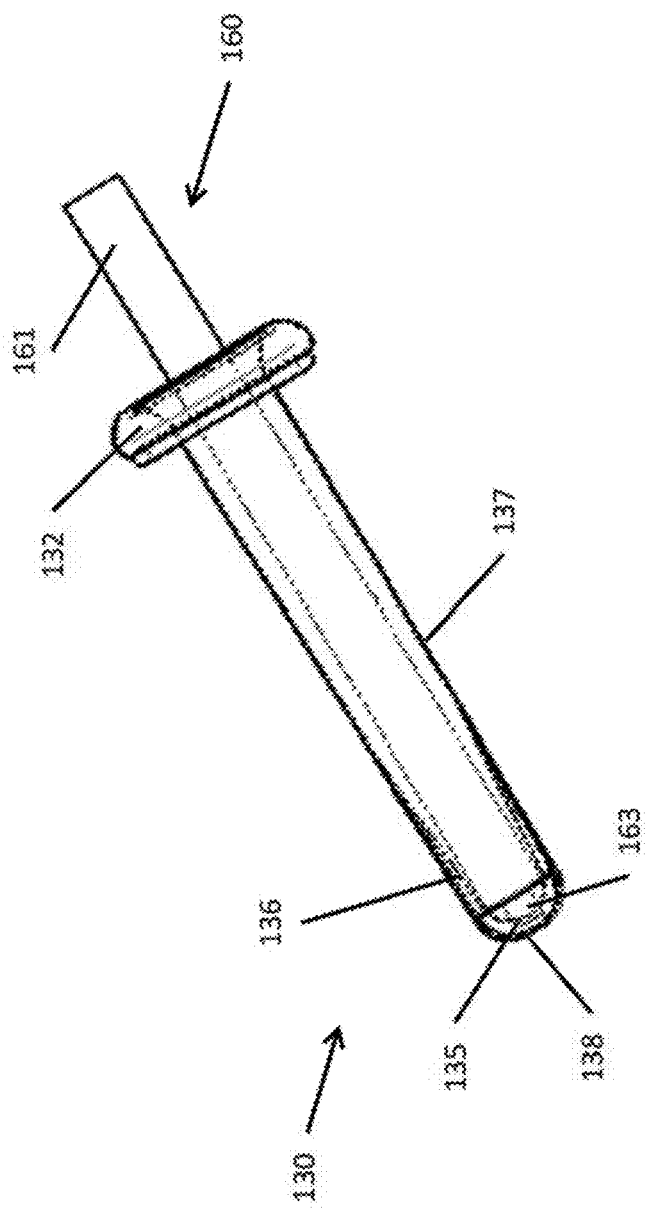
FIG. 5 illustrates a close-up view of a tract insert and a push rod.

FIG. 5 illustrates a different close-up view of a tract insert 130 and a push rod 160. The tract insert 130 includes an artificial vulva 132. A receptacle support 137 projects substantially perpendicular from a bottom surface of the artificial vulva 132. A receptacle securing mechanism 138 is located at a distal end of the receptacle support 137 to secure an elongated receptacle 136. The push rod 160 is inserted into the tract insert 130 to elongate and secure the receptacle 136 to the receptacle securing mechanism 138. The push rod 160 includes a shaft 161. A head 163 including an engaging feature 135 is attached to an end of the shaft 161.

Figure 6:
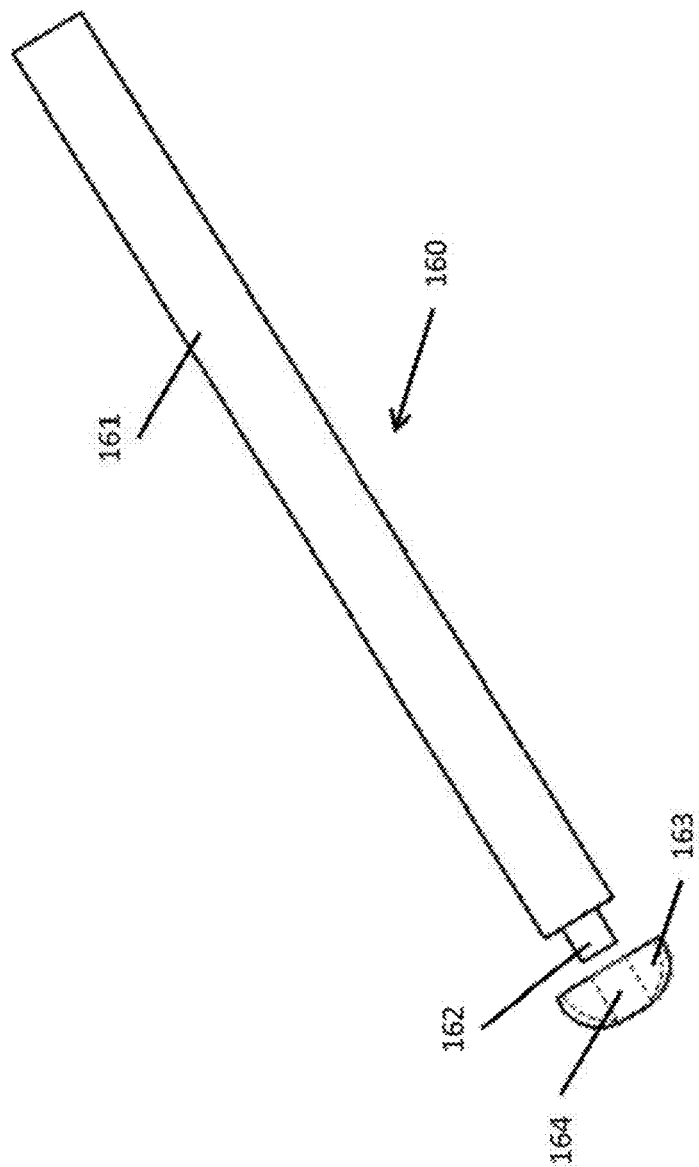
FIG. 6 illustrates an exploded view of a push rod.

FIG. 6 illustrates an exploded view of a push rod 160. The push rod includes a shaft 161 with a mating pin 162 located at an end of the shaft 161. A recess 164 of a head 163 is secured to the mating pin 162.

Figure 7:
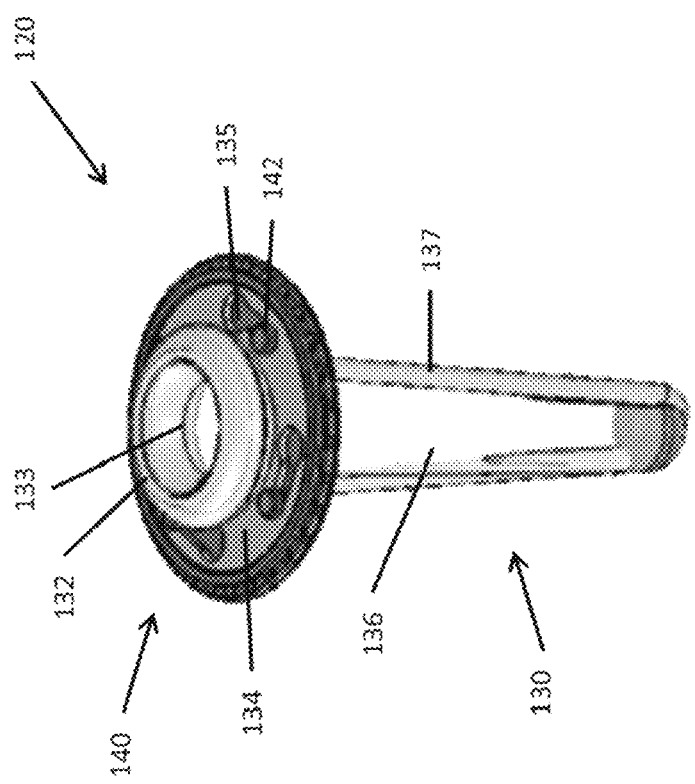
FIG. 7 illustrates a close-up view of a tract.

FIG. 7 illustrates a different close-up view of a tract 120. A tract insert 130 includes an artificial vulva 132 mounted to a top surface of a flange 134. The flange 134 includes one or more engaging features 135. The artificial vulva 132 forms an orifice 133. A receptacle 136 is secured to the artificial vulva 132 and elongated through the orifice 133 in a substantially perpendicular direction to a bottom surface of the flange 134. A receptacle support 137 also extends in a substantially perpendicular direction to the bottom surface of the flange 134 to support the elongated receptacle 136. A tract locking mechanism 140 is also illustrated. The tract locking mechanism 140 includes one or more locking features 142 located on a top surface of a flange 134. The tract insert 130 can be inserted into the tract locking mechanism 140. Once inserted, the one or more engaging features 135 of the tract insert 130 can be removably secured to the one or more locking features 142 of the tract locking mechanism 140.

Figure 8:
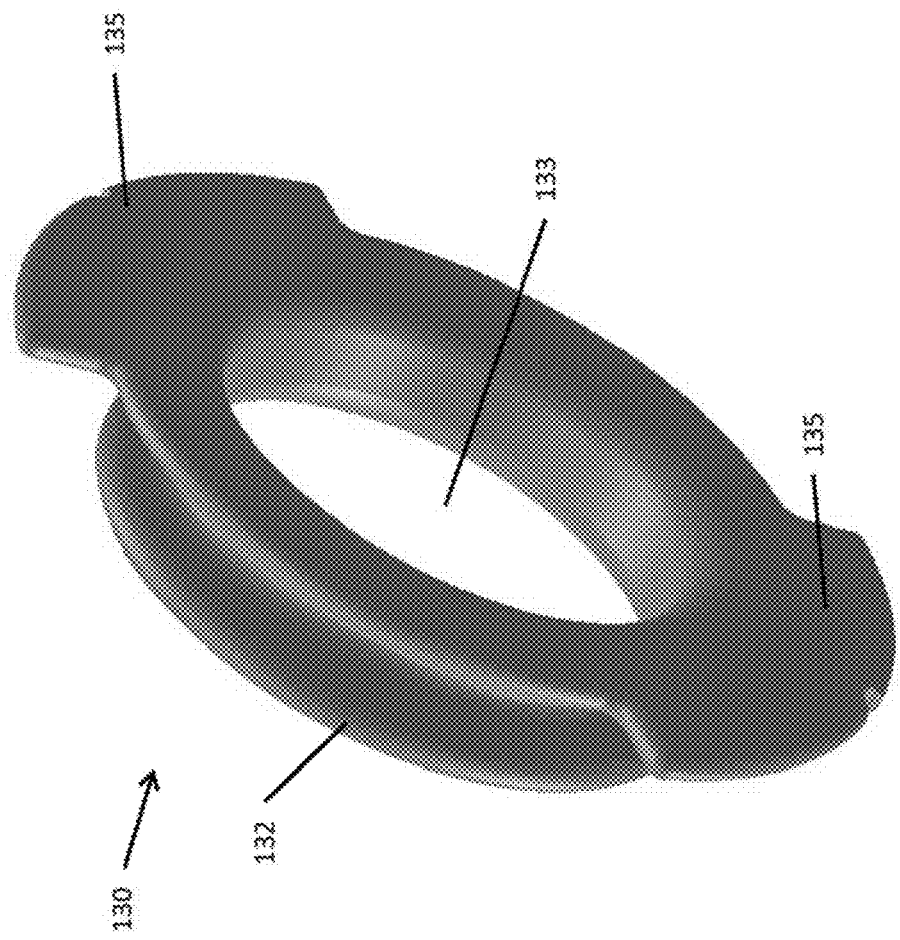
FIG. 8 illustrates a perspective view of a tract insert.

FIG. 8 illustrates a perspective view of a tract insert 130. The tract insert 130 includes an artificial vulva 132. The artificial vulva 132 forms an orifice 133. The tract insert 130 includes one or more engaging features 135 projecting radially outward from the orifice 133.

Figure 9:
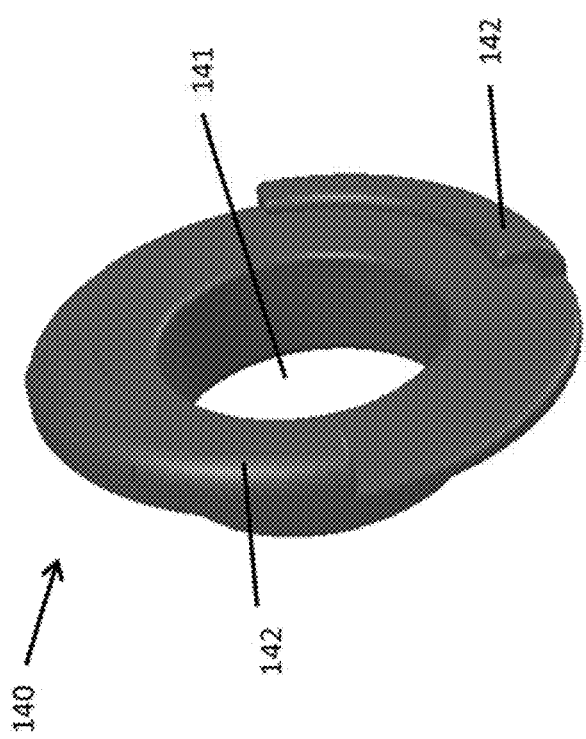
FIG. 9 illustrates a perspective view of a tract locking mechanism.

FIG. 9 illustrates a perspective view of a tract locking mechanism 140. The tract locking mechanism includes one or more locking features 142 affixed to a top surface. The one or more locking mechanisms 142 are located around an outer perimeter of a cutout 141 of the tract locking mechanism 140.

Figure 10:
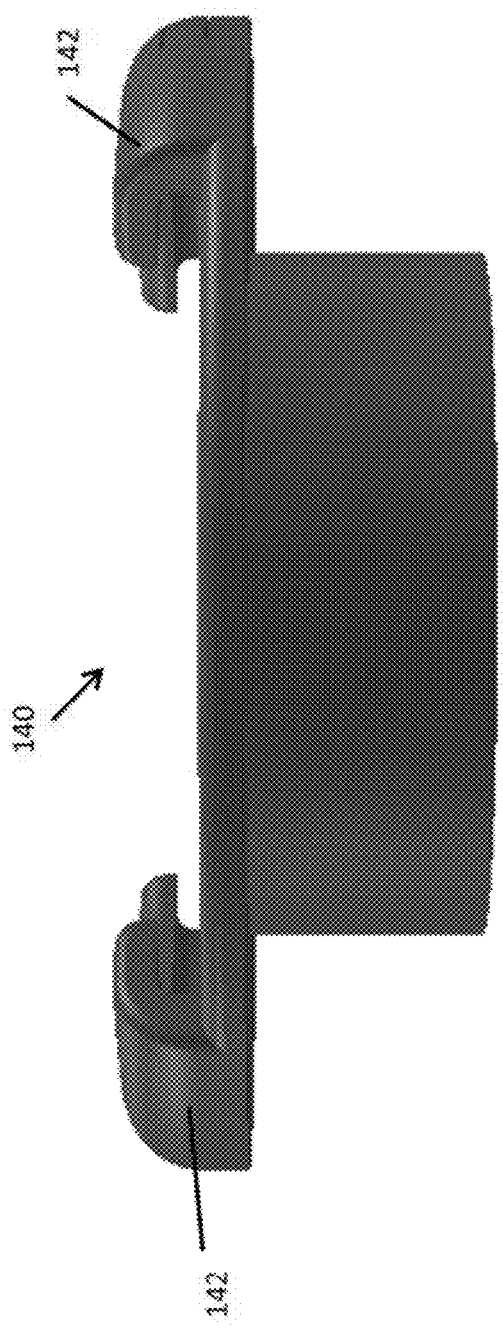
FIG. 10 illustrates a side view of a tract locking mechanism.

FIG. 10 illustrates a side view of a tract locking mechanism 140. The tract locking mechanism includes one or more locking features 142 affixed to a top surface.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A behavioral training aid system comprising:
   (I) a behavioral training and comprising:
      a. a body;
      b. a tract including:
         i. a tract locking mechanism that secures the tract to an outer surface of the body; and
         ii. a tract insert removably attached to the tract locking mechanism, wherein the tract insert is configured to receive a receptacle so that the receptacle is elongated and forms a depository within the body;
      c. one or more legs extending from the body; and
      d. one or more base supports extending from a distal end of the one or more legs; and
   (II) a push rod comprising a head mounted to a distal end of a shaft configured to elongate the receptacle, wherein the head of the shaft is inserted into the receptacle and pushed to elongate the receptacle until an end of the receptacle is secured by a receptacle securing mechanism.

2. The behavioral training aid system according to claim 1, wherein the tract insert further comprises an artificial vulva forming an orifice, and the artificial vulva connects the receptacle to the behavioral training aid and the push rod elongates the receptacle through the orifice so that the receptacle forms the depository within the body.

3. The behavioral training aid system according to claim 1, wherein a voice box is located within the body.

4. The behavioral training aid system according to claim 3, wherein the voice box is customizable to mimic mating calls of a desired animal.

5. The behavioral training aid system according to claim 1, wherein the receptacle is disposable and replaceable after each training session.

6. The behavioral training aid system according to claim 1, wherein the one or more base supports are feet and are mounted to one or more platforms.

7. The behavioral training aid system according to claim 6, wherein each of the one or more base supports are mounted to a surface of a platform via fasteners, a non-slip gripping material, adhesives, or a combination thereof.

8. The behavioral training aid system according to claim 2, wherein the artificial vulva is expandable.

9. The behavioral training aid system according to claim 1, wherein the body includes a weighted material to substantially eliminate movement of the behavioral training aid.

10. The behavioral training aid system according to claim 1, wherein the tract insert comprises one or more engaging features, the tract locking mechanism comprises one or more locking features, and the one or more engaging features interact with the one or more locking features to removably secure the tract insert to the tract locking mechanism.

11. The behavioral training aid system according to claim 2, wherein the tract insert further comprises a receptacle support protruding from a bottom surface of the artificial vulva to substantially maintain a shape of the receptacle when elongated; and
    wherein the receptacle securing mechanism is located at a distal end of the receptacle support and secures the end of the receptacle when elongated.

12. The behavioral training aid system according to claim 1, wherein the tract locking mechanism is secured to the outer surface of the body using a plurality of fasteners, an adhesive material, or a combination thereof.

13. The behavioral training aid system according to claim 12, wherein the tract locking mechanism includes a plurality of contact surfaces on an interior surface to substantially decrease rotation of the tract locking mechanism when secured to the body.

14. A behavior training aid system comprising:
(I) a behavioral training aid comprising,
   a. a body;
   b. a tract including:
      i. a tract locking mechanism that secures the tract to an outer surface of the body; and
      ii. a tract insert comprising an artificial vulva that forms an orifice removably attached to the tract locking mechanism, wherein the tract insert is configured to receive a receptacle so that receptacle is elongated and forms a depository within the body, and the receptacle is fastened to an artificial vulva and elongated through the orifice to form the depository within the body;
   c. one or more legs extending from the body, wherein the one or more legs adjusts a height and a pitch of the body;
   d. one or more base supports extending from a distal end of the one or more legs; and
   e. a voice box located within the body; and
(II) a push rod comprising a head mounted to a distal end of a shaft configured to elongate the receptacle, wherein the head of the shaft is inserted into the receptacle secured to the artificial vulva and pushed to elongate the receptacle until an end of the receptacle is secured by a receptacle securing mechanism.

15. The behavior training aid system according to claim 14, wherein the receptacle is disposable and replaceable after each training session.

16. The behavioral training aid system according to claim 14, wherein the one or more base supports are feet mounted to one or more platforms for via fasteners, a non-slip gripping material, adhesives, or a combination thereof.

17. The behavioral training aid system according to claim 1, wherein the shaft comprises a mating pin, the head of the push rod comprises a recess, and the mating pin is inserted into the recess to create a press-fit attachment.

18. The behavioral training aid system according to claim 10, wherein the one or more engaging features are keyhole slots and the one or more locking features are protruding heads that are inserted into the keyhole slots to secure the tract insert to the tract locking mechanism.

19. A behavioral training aid system comprising:
(I) a behavioral training aid comprising:
   a. a body;
   b. a tract including:
      iii. a tract locking mechanism that secures the tract to an outer surface of the body; and
      iv. a tract insert comprising an artificial vulva that forms an orifice removably attached to the tract locking mechanism, wherein the tract insert is configured to receive a receptacle so that the receptacle is elongated and forms a depository within the body, and the receptacle is fastened to the artificial vulva and elongated through the orifice to form the depository within the body, and wherein the receptacle is disposable and replaceable after each training session;
   c. one or more legs extending from the body, wherein the one or more legs adjusts a height and a pitch of the body;
   d. one or more feet extending from a distal end of the one or more legs, wherein the one or more feet are mounted to a top surface of a platform for additional stability using fasteners, non-slip gripping material, adhesives, or a combination thereof; and
   e. a voice box located within the body; and
(II) a push rod comprising a head mounted to a distal end of a shaft, wherein the head of the shaft is inserted into the receptacle secured to the artificial vulva and pushed to elongate the receptacle until an end of the receptacle is secured by a receptacle securing mechanism.

* * * * *